United States Patent [19]
VonHoene et al.

[11] Patent Number: 5,338,373
[45] Date of Patent: Aug. 16, 1994

[54] METHOD OF ENCODING AND DECODING A GLASSY ALLOY STRIP TO BE USED AS AN IDENTIFICATION MARKER

[76] Inventors: Robert M. VonHoene, 146 Galloping Hill Rd., Basking Ridge, N.J. 07920; Ryusuke Hasegawa, 29 Hill St., Morristown, N.J. 07960

[21] Appl. No.: 44,094

[22] Filed: Apr. 6, 1993

Related U.S. Application Data

[63] Continuation of Ser. No. 747,767, Aug. 20, 1991, abandoned.

[51] Int. Cl.$^5$ .......................... C21D 9/52; H04B 1/59; G08B 13/26
[52] U.S. Cl. .................... 148/121; 148/304; 148/403; 148/565; 148/903; 340/572
[58] Field of Search ............. 148/403, 304, 903, 121, 148/565, 639; 428/606, 607, 687, 928; 340/572, 551

[56] References Cited

U.S. PATENT DOCUMENTS

| Re. 32,427 | 5/1987 | Gregor et al. | 340/572 |
|---|---|---|---|
| Re. 32,428 | 5/1987 | Gregor et al. | 340/572 |
| 4,221,257 | 9/1980 | Narasimhan | 164/87 |
| 4,268,325 | 5/1981 | O'Handley et al. | 148/108 |
| 4,322,481 | 3/1982 | Krause | 428/573 |
| 4,332,848 | 6/1982 | Narasimhan | 428/573 |
| 4,380,572 | 4/1983 | Liebermann et al. | 428/592 |
| 4,510,489 | 4/1985 | Anderson et al. | 340/572 |
| 4,510,490 | 4/1985 | Anderson et al. | 340/572 |
| 4,565,746 | 1/1986 | Hayase | 428/928 |
| 4,685,980 | 8/1987 | Sato et al. | 148/304 |
| 4,686,516 | 8/1987 | Humphrey | 340/572 |
| 4,749,625 | 6/1988 | Obayasi et al. | 148/403 |
| 4,913,750 | 4/1990 | Kakuno et al. | 148/304 |

FOREIGN PATENT DOCUMENTS

| 216584 | 1/1987 | European Pat. Off. | |
| 3545674A1 | 6/1987 | Fed. Rep. of Germany. | |
| 59-4108 | 1/1984 | Japan | 148/304 |
| 60-145360 | 7/1985 | Japan | 148/304 |
| 61-24208 | 2/1986 | Japan | 148/304 |
| 62-227070 | 10/1987 | Japan | 148/304 |
| 63-239906 | 10/1988 | Japan | 148/902 |
| 173148 | 11/1990 | Japan. | |
| 2167627A | 5/1986 | United Kingdom. | |

*Primary Examiner*—John Zimmerman

[57] ABSTRACT

A process for making a large number of magneto-mechanically resonant markers having distinct resonant characteristics is disclosed. The process comprises modifying at least one surface of a glassy metal alloy strip so as to cause the effective length of the alloy strip to be different from the physical length thereof. Resonant markers comprising alloy strips treated by the process of the present invention display unique and distinguishable resonant characteristics which gives the marker a unique identity. The resonant markers can be used for article surveillance, inventory control and personnel identification.

15 Claims, 4 Drawing Sheets

METHOD OF ENCODING AND DECODING A GLASSY ALLOY STRIP TO BE USED AS AN IDENTIFICATION MARKER

This application is a continuation of application Ser. No. 747,767 filed Aug. 20, 1991, now abandoned.

SUMMARY OF THE INVENTION

The present invention is directed to a method for making a large number of magneto-mechanically resonant markers having unique and distinguishable resonant characteristics such as output voltage, frequency and output voltage profile, and to the magneto-mechanical resonant marker having said unique and distinguishable resonant characteristics. It has been found that the resonant characteristics may be altered by introducing a modification onto the glassy metal alloy strip (alloy strip) which is used to make the marker. The shape, number and orientation of the modification(s) all have different, measurable effects on the resonant characteristics of the marker. Thus, using the processes of the present invention it is now possible to create a number of mechanically resonating markers each having different resonant characteristics (universe) from alloy strips having the same chemical composition and geometric parameters (length, width and thickness). Prior to the present invention the universe available was fairly small, and constrained due to practical considerations such as the geometric parameters of the alloy strips and the limited number of alloy chemistries available for resonant markers. These considerations limited the number of distinct frequencies which could be created in a resonant marker. The present invention greatly increases the universe which can be generated using alloy strips suitable for magneto-mechanical resonant markers.

BACKGROUND OF THE INVENTION

The use of glassy metal alloy strips to make resonant markers for article surveillance has grown dramatically over the past ten years. However, there are still many uses for such resonant markers which require a large number of resonant tags each having unique and discernable resonant characteristics. Examples of such uses include inventory control, baggage routing and control at airports, personnel identification and article surveillance and control. However prior methods have failed to provide a way to produce enough distinct markers to make resonant tags practical for uses requiring a large number of unique and distinguishable targets.

Resonant markers comprise strips of a glassy metal alloy ribbon which resonate, either electrically or mechanically, when subjected to an ac field. In the case of mechanically resonating markers, the resonant wave characteristics, wavelength, amplitude and output voltage profile, can be measured by applying an interrogating pulse or burst to the glassy metal alloy strip (alloy strip), and measuring the dampening resonance. Methods for altering the resonant characteristics include changing the physical parameters (dimensions) of the alloy strip or changing the chemical composition of the alloy strip. U.S. Pat. Nos. 4,510,489 and 4,510,490 disclose magnetomechanical markers which may be used in an article surveillance system. Each marker comprises a plurality of rectangular strips which are adjacent to a ferromagnetic element. These patents further disclose that the resonant frequency of the marker may be tailored by altering the composition, thermal preparation and/or physical parameters of the alloy strip.

However, the above methods are undesirable because the alterations must be effected at the point where the resonant markers are made, and because there are a relatively limited number of chemical compositions which are appropriate for resonant markers and a limited range of marker sizes which are practical. Thus, the universe of distinct resonant markers which could be produced according to the above patents is relatively small.

Methods for locally heat-treating thin amorphous alloy strips are disclosed in Japanese application No. 173148/1980. The amorphous alloy contains 70 atomic % or more Fe, and may be used as a magnetically soft electromagnetic material. The heat treatment may be induced via irradiation with a laser or electron beam, or current may be fed through a metal needle or edge.

However, the above application discloses a method for producing an amorphous alloy strip having a low iron loss to be used as a magnetically soft electromagnetic material, and neither the effects of the heat treatment on the resonant characteristics of the amorphous alloy strips nor the utility of the material for use as resonant markers was recognized.

U.S. Pat. Nos. Re. 32,427 and Re. 32,428 disclose harmonic markers comprising amorphous ferromagnetic alloy strip, and optionally one or more magnetizable elements. The magnetizable elements may be provided as a part of the strip by altering (e.g. crystallizing) a portion of the strip via spot welding, heat treatment with coherent or incoherent radiation, charged particle beams, directed flames, or heated wires. The magnetizable elements have higher coercivities than the amorphous material, and the resulting strip generates magnetic fields at frequencies which are harmonically related to the interrogating field. The addition of magnetizable elements as disclosed in the patents does not affect the fundamental mode of operation of the envisaged device; namely, the frequencies generated in the interrogating zone are harmonics of the interrogating field, and the presence of magnetizable elements does not provide the markers with individual identities and therefore does not increase the universe which can be generated.

Accordingly, an object of the present invention is to provide an encoding method that would enable simplified mass encoding which could provide a large number of alloy strips each having unique and discernable resonant characteristics. Another object is to provide a method of encoding which could be carried out at a point other than the point of manufacture of the markers. Encoding could be effected by the manufacturer of the alloy strips, the manufacturer of the resonant markers, or by the end user. Another object of the present invention is to provide resonant markers having measurably distinct resonant wave characteristics as described above, thereby increasing the universe without complicating the production process.

J/cm² with 28 lines perpendicular to the length of the strip.

Figure 5:
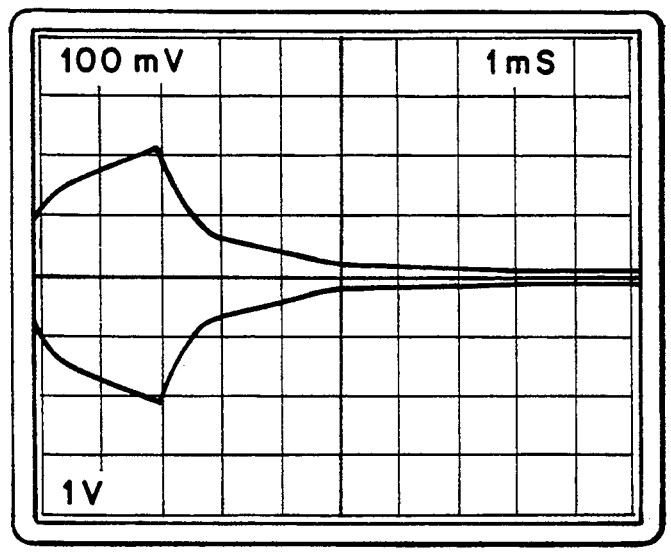

FIG. 5 is the output voltage profile of an alloy which has been laser scribed at a fluence level of 0.16J/cm² with 3 lines perpendicular to the length of the strip.

Figure 6:
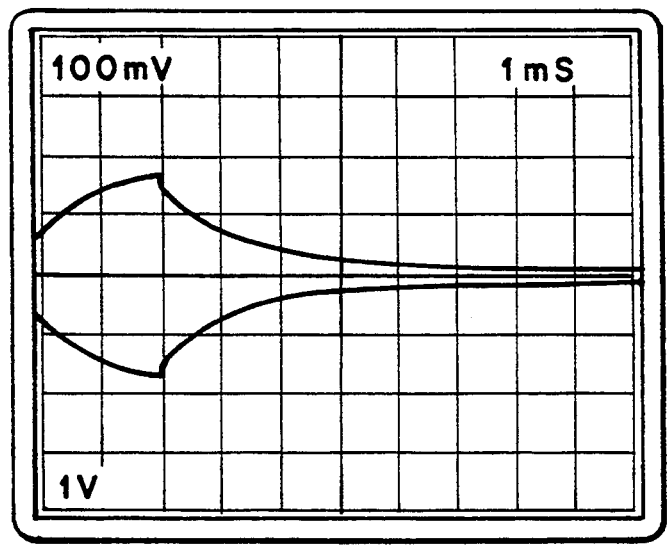

FIG. 6 is the output voltage profile of a marker which has been laser scribed at a fluence level of 0.073 J/cm² with 7 lines perpendicular to the length of the marker.

Figure 7:
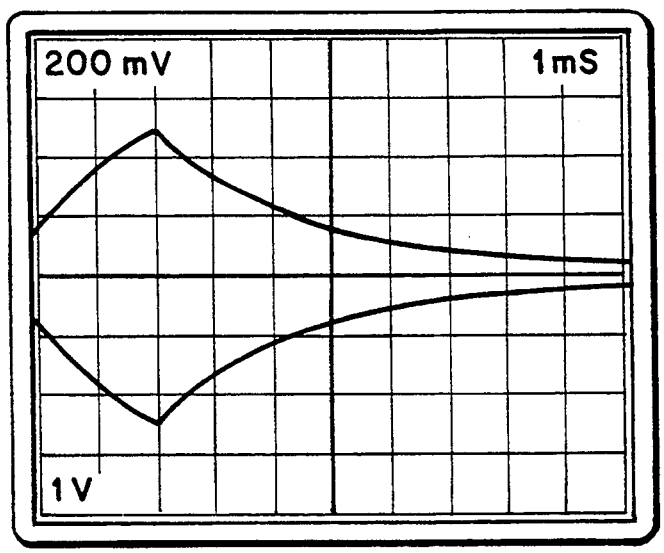

FIG. 7 is the output voltage profile of a marker which has been laser scribed at a fluence level of 0.16J/cm² with one line parallel to the length of the alloy strip.

Figure 8:
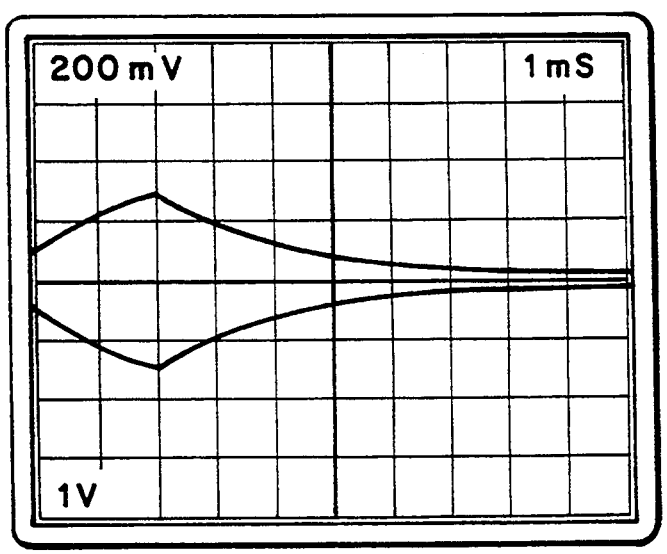

FIG. 8 is the output voltage profile of a marker which has been laser scribed at a fluence level of 0.16 J/cm² with three lines parallel to the length of the alloy strip.

Figure 9:
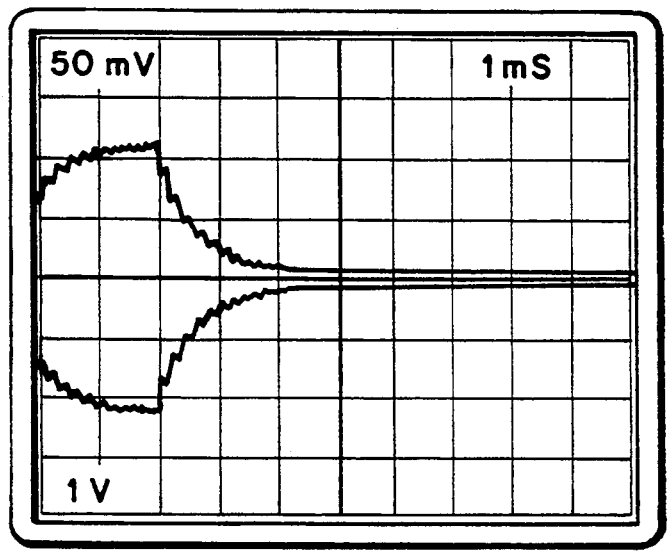

FIG. 9 is the output voltage profile of a marker having ends cut at an angle of 20° from the length of the marker.

Figure 10:
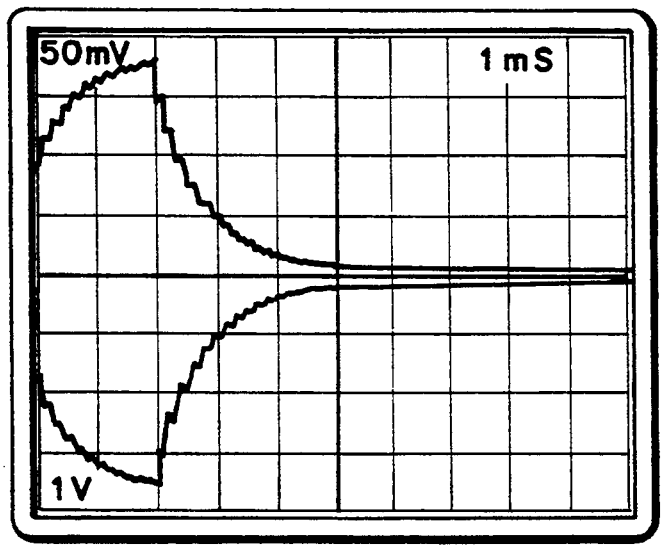

FIG. 10 is the output voltage profile of a marker having ends cut at an angle of 25° from the length of the marker.

DETAILED DESCRIPTION OF THE INVENTION

The present invention provides a process for altering the effective length of an alloy strip thereby altering at least one resonant characteristic of the alloy strip and providing a magneto-mechanical resonant marker (resonant marker) having unique and distinguishable resonant characteristics such as output voltage, frequency or output voltage profile. The effective length of the alloy strip is altered by introducing at least one physical modification onto the alloy strip, resulting in an alloy strip having unique resonant characteristics compared to an unmodified or differently modified alloy strip. Further, the length, depth, orientation and spacing of the surface modification(s) all have different effects upon the effective length, and consequently on the resonant characteristics. Thus, it is now possible to create a large number of resonant markers, each having measurably distinct resonant characteristics. Further, the surface modification(s) may be imparted at the point of manufacture, the point of use, or at any point therebetween.

The alloy strips may be made of any magnetostrictive soft magnetic material, which is mechanically flexible enough to maintain mechanical resonance for a certain period of time. The range of the saturation magnetostriction is preferably between about 5 ppm and about 35 ppm, which can be readily achieved in Fe, Fe-Ni, Fe-Co and Fe-Co-Ni based metallic alloys. The magnetic alloys may be used in the as-cast form, or may be further annealed to achieve partial or full crystallization, such as in the case of nanocrystalline alloys.

The soft magnetic material is rapidly solidified to form a thin ribbon. Any method for rapid solidification may be used, such as depositing the molten material on a rapidly rotating chill wheel. Such a process is disclosed in U.S. Pat. No. 4,221,257, and incorporated herein by reference. The soft magnetic material is preferably cast so that no crystalline structure is formed. Once the ribbon has been formed, the ribbon is cut into strips. The resonant frequency and the output voltage of a resonant marker are, respectively, inversely and directly proportional to the physical length of the alloy strip. Thus, changing the physical length of the strips without changing the geometric shape (rectangular) is one known way to change the resonant characteristics of a resonant marker.

For purposes of the present invention the physical length of the alloy strips is not critical and may be kept constant, or may be varied, to provide the desired number of resonant markers required by a particular use. However, the physical length of the alloy strip must be greater than the width, or the pole of resonance will be changed (i.e., the marker will resonate along the width instead of the length). Further, while no particular length is required, there are certain physical lengths which make the use of resonant markers more practical. These preferred physical lengths are between about 2 cm and about 5 cm. Likewise, the width and thickness of the alloy strip are also not critical, and are dictated primarily by the casting conditions. Accordingly, widths are usually between about 0.5 cm and about 2.0 cm, and the thickness is usually between about 0.0015 cm and about 0.005 cm.

Figure 1:
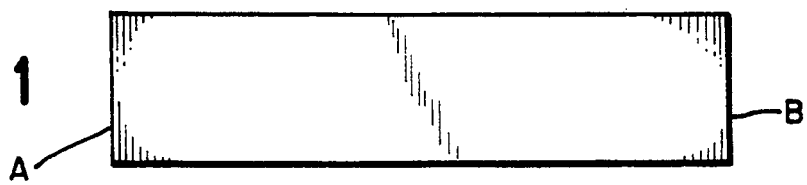
FIG. 1 is a drawing of a rectangular alloy strip.
Figure 2:
FIG. 2 is a drawing of a parallelogram shaped alloy strip.

The fundamental aspect of this invention is that the modification to the alloy strip be of such a nature as to change the effective length of the marker. The effective length of an alloy strip may be calculated for a modified strip by using the physical length and resonant frequency of an unmodified strip having the same composition. Physical length is the distance between one end of an alloy strip and the opposite end, said distance being measured parallel to the longest edge, and at the greatest dimension. For alloy strips having non-parallel edges the physical length is the longest measurement which can be taken parallel to the longest edge. For example, the physical length of the alloy strip shown in FIG. 1 is the distance between edge "A" and edge "B". Similarly, the physical length of the alloy strip of FIG. 2 is the distance between "C" and "D". Even though the strip of FIG. 2 has a different geometry (parallelogram) than that of the alloy strip of FIG. 1 (rectangular) the physical length of the strips is the same.

The resonant frequency of a marker is inversely proportional to the length (both the physical and effective) of the alloy strip, and may be represented by the formula:

$$f_r = v/2l$$

where $f_r$ is the mechanical resonant frequency of a particular alloy strip and v is the acoustic velocity which is specific to each alloy. The acoustic velocity, v, is calculated by measuring the resonant frequency for a given physical length of a non-modified alloy strip and applying the formula. In accordance with the present invention, a marker comprising a modified alloy strip resonates at a frequency which is different than that of an unmodified alloy strip of the same physical length. Thus, from the above recited formula the calculated length of the modified alloy strip is different than the physical length of the modified alloy strip. This "different" length (i.e., from the physical length), is the "effective length" of the modified alloy strip.

Modification(s) may be introduced onto the alloy strip in any way. Examples of modification(s) which are contemplated by the present invention include modification(s) which are a result of: mechanical scratching, scribing, chemical etching, lasing or irradiating with an electron beam. Moreover, alloy strips could be mechanically stamped or imprinted with the modification(s) (during or after casting), material could be added to the alloy strip (for example by welding, gluing, vapor deposition or chemical bonding) or the geometry of the strip (e.g. the edges could be cut at angles to the length of the alloy strip) could be altered. Any surface modification which is capable of altering the effective length of the alloy strip is sufficient, and further methods of adding appropriate modification(s) will be apparent to one skilled in the art by applying the teachings of the present invention.

The modification(s) of the present invention must be strong enough to effect the resonant characteristics of the alloy strip and the resulting marker. However, if the modification(s) are too severe the resonant characteristics of the alloy strip become too weak to measure. Preferably, the introduction of the modification(s) should not affect the overall microstructure of the alloy strip. Accordingly, a preferred way of introducing modification(s) onto the alloy strips is via laser or irradiation from an electron beam, because the intensity of the irradiation, and consequently the depth of the surface modification(s) is readily controlled. For example, where a laser is used to impart the surface modification(s) onto an alloy strip having a composition of $Fe_{40}Ni_{38}Mo_4B_{18}$, the intensity (fluence) of the laser is preferably between about 0.07 $J/cm^2$ and 0.3 $J/cm^2$. For the above composition, it has been found that as the fluence is decreased below about 0.07 $J/cm^2$, the surface is not effectively modified, and at fluence levels greater than about 0.3 $J/cm^2$ the structure of the alloy strip is altered to such a degree that the output voltage of the resulting marker is not strong enough to be detected. Fluences between 0.07 $J/cm^2$ and 0.2 $J/cm^2$ are more preferred, because the modification(s) introduced to the surface of the alloy strips at those fluence levels cause easily detectible differences in at least one resonant characteristic of the resulting marker. Thus, where a laser is used to modify the surface of the alloy strip, changing the fluence of the laser is one way to produce a number of distinct alloy strips, and thereby increase the universe of markers available. While the preferred fluence ranges may vary slightly for alloy strips made from other compositions, the appropriate fluence can be readily determined by one skilled in the art applying the teachings of the present invention. Parameters for the intensity of modification(s) which are introduced via other means are similarly determinable by one skilled in the art using the teachings of the present invention.

The surface modification(s) introduced onto the alloy strip may have any configuration, such as line(s), dot(s), dash(es), etc. However line(s) are preferred because of the ease of introduction, and the ease of reproducibility. Further, the configuration of the surface modification(s) effects the resonant characteristics of the resulting marker. Thus, changing the configuration of the surface modification(s) which are introduced is another way to alter the resonant characteristics of the alloy strip, and further increase the possible universe of markers.

The number of surface modifications introduced onto the alloy strip also effects the resonant characteristics, and is yet another way to increase the universe of markers which can be produced according to the present invention. Any number of surface modifications may be introduced onto a given alloy strip; however, there should be adequate spacing between the surface modifications. Where there is inadequate spacing between surface modifications, the resonant properties of the resulting marker are not well defined when compared with markers having adequately spaced surface modifications. Preferably, there are no more than about 10 surface modifications per centimeter. For example, where lines are introduced parallel to the length of the alloy strip, the number of lines which could be introduced would be limited by the width of the alloy strip, and would preferably be between 1 and about 10 for an alloy strip having a width of 1 cm. If lines are introduced perpendicular to the length of the alloy strip, the number of lines which could be introduced onto the alloy strip would be limited by the length of the alloy strip and would preferably be between 1 and about 30 for a 3 cm long strip.

The thickness or width of the surface modification(s) may also be varied. Modification(s) which are between about 0.015 cm and about 0.05 cm are preferred.

Further the spacing between the modifications is also important. Even spacing between the modifications is critical to attaining distinct output voltage profiles and is preferred.

The surface modification(s) may also have an orientation that is at an angle to the longitudinal axis of the alloy strip. The number of such surface modification(s) is likewise limited by the dimensions of the alloy strip. Again, using lines as an example, the number of lines which could be introduced onto an alloy strip having dimensions of 1.0 cm by 3.0 cm and oriented at about 45° to the longitudinal axis of the alloy strip is preferably between 1 and about 20 lines.

Surface modification(s) which have been introduced to the alloy strip at a 45° may be preferable for some applications. For example, where the surface modification(s) which are introduced are lines, the resonant frequency increases linearly with increasing fluence. Thus the resonant frequency of the alloy strip, and the resulting marker may be increased by a calculated amount simply by altering the fluence of the laser.

Lines which are introduced perpendicular to the alloy strip at even intervals create unique and easily distinguishable output voltage profiles and are preferred for applications where a large number of unique output voltage profiles are desired.

Although the mechanism is not fully understood, it is believed that surface modification(s) which are introduced onto a glassy metal alloy strip alter the vibrational modes of the alloy strip, which is manifested as an effective length and resonant characteristics such as output voltage profile which differ from that of an unmodified alloy strip.

The surface modification(s) may be introduced onto the surface of the alloy strips during quenching or winding of the strips, after the strips have been cut, or after the strip has been placed in a suitable article surveillance housing. If encoding is carried out after encasing the alloy strip in a housing, one must consider the effect of the housing on imparting the surface defect to the strip. For example, if an encased marker were to be scribed via a laser, at least part of the housing would have to be transparent to the laser beam.

Usually, the ductility and workability of the alloy strips are not altered by the introduction of surface modification(s).

The universe may further be increased by any method known in the art, such as changing the physical dimensions and/or the composition of the alloy strip, as well either alone or in combination with the introduction of surface modification(s) according to the present invention.

In use markers are attached to items to be tracked, such as store merchandise, inventory, baggage or employees. An interrogation zone capable of detecting the presence of a marker of the present invention is provided. The markers are decoded (or read) by applying an interrogating pulse or burst to the alloy strip, and measuring the resonance. Any method for generating an ac field may be used, and such configurations have been disclosed in U.S. Pat. Nos. 4,510,489 and 4,510,490, incorporated herein by reference. Likewise, any method capable of detecting the resonance characteristics (resonant frequency, voltage output, and/or output voltage profile) may be used.

Output voltage profiles are generated by applying an external magnetic field to the marker which causes the marker to mechanically resonate. Removal of the exciting field results in the decay of the resonance which is charted by an oscilloscope hooked up in series with the sensing coil. Because the exciting field is stopped, the decay portion of the output voltage profile is substantially free of noise, and any features in the profile may be attributed to the resonance of the marker.

Figure 3:
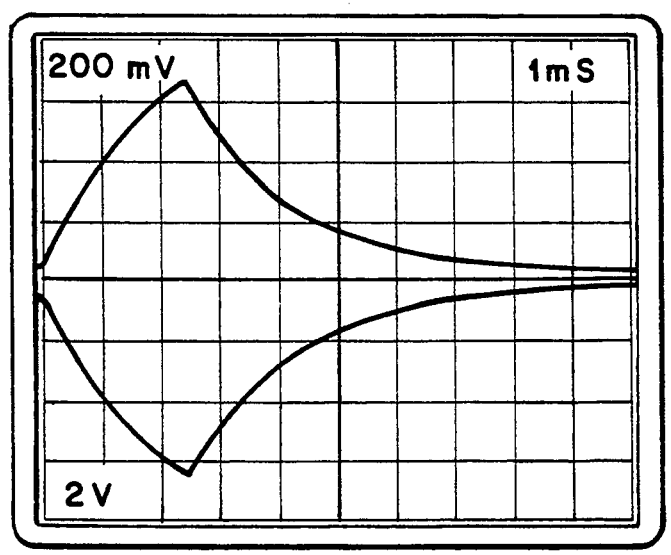
FIG. 3 is the output voltage profile of a non-scribed alloy strip.

Each marker having a unique pattern of surface modifications displays a unique output voltage profile. The output voltage of a non-modified amorphous alloy strip with a composition of $Fe_{40}Ni_{38}Mo_4B_{18}$ and dimensions $3.81 \times 1.27 \times 0.0028$ cm is shown in FIG. 3. The initial increase (ring-up) in the output voltage profile is a result of the imposition of the interrogating field. The interrogating field is stopped and the output voltage profile decays (ring down) exponentially.

Figure 4:
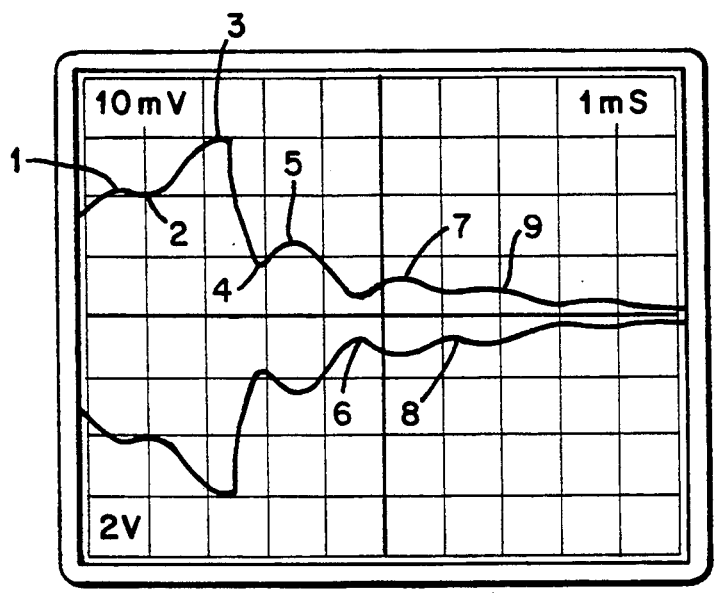
FIG. 4 is the output voltage profile of an alloy strip which has been laser scribed at a fluence level of 0.16

FIG. 4 shows the output voltage profile for a magnetic alloy strip having the same composition and dimensions as the strip discussed in conjunction with FIG. 3. However, the strip whose profile is shown in FIG. 4 has been scribed with 28 lines perpendicular to the length of the marker. As in FIG. 3, the ring-up is due to the imposition of the interrogating field. However, the ring-up for the strip of FIG. 4 displays an additional peak and a node (labeled "1" and "2" respectively). Once the interrogating field is stopped, the ring down displays peak regions 5, 7, and 9, and node regions 4, 6 and 8, each with a distinct amplitude and period. Each alloy strip having a unique configuration of modification(s) will have a unique and distinguishable output voltage profile from any other marker.

FIGS. 5 and 6 display the output voltage profiles of marker strips having the same composition and physical dimensions as the strips whose profiles are shown in FIGS. 3 and 4. However, the alloy strips of FIGS. 5 and 6 have been scribed with 3 and 7 lines perpendicular to the length of the alloy strip respectively at 0.16 and 0.073 J/cm² respectively. The output voltage profile shown in FIG. 5 has a steep squarish ring up and a steep ring down which levels into a small peak. The output voltage profile shown in FIG. 6 displays a rounded bowl-like ring up having several small peaks and nodes, and a long, gradual ring down with several small peaks and nodes. The output voltage profiles shown in FIGS. 5 and 6 are clearly different from each other and from the profiles shown in FIGS. 3 and 4.

FIGS. 7 and 8 show the output voltage profiles for alloy strips scribed with one and three lines respectively, parallel to the length of the alloy strip at a fluence of 0.16J/cm². The profiles for the alloy strips have ring-ups which are flatter, and less intense than any of the other output voltage profiles. Even though there are no additional peak and node regions, the shape of the profiles are distinct and distinguishable from each other, as well as from the previous profiles.

FIGS. 9 and 10 show the output voltage profiles of alloy strips which are parallelogram-shaped instead of rectangular. The length of the alloy strips was the same as the strips whose output voltage profiles discussed above. FIG. 9 shows the output voltage profile for a strip whose edges are at a 20° angle from the length. FIG. 10 shows the output voltage profile for a strip whose edges are at a 25° angle from the length. FIG. 9 shows a steep, bowl-shaped ring up, and a steep ring down. The overall shape of the output voltage profile is similar to the profile of FIG. 3, except that the ring up and down are much rounder, and FIG. 9 has small ripple-like nodes and peaks throughout the profile. FIG. 10 is similar to FIG. 9, except that the profile is steeper and the amplitude at the cessation of the interrogating field is greater than that of FIG. 9. There are more peaks and nodes in the profile of FIG. 10, and the peaks and nodes are slightly less pronounced than those of FIG. 9. Thus, FIGS. 9 and 10 are clearly different from the preceding output voltage profiles, and are distinguishable from each other upon visual inspection.

The differences in the shapes of the output voltage profiles clearly show the effect of introducing modification(s) onto an alloy strip. Thus it is apparent that the type, number, depth and orientation of the surface modification(s) effects the output voltage profile of the resulting marker. Each scribed marker has a unique profile which may be used to uniquely identify a marker having a particular surface modification configuration.

EXAMPLE 1

An alloy with the composition $Fe_{40}Ni_{38}Mo_4B_{18}$ was melted, and expelled through a slotted nozzle and onto the peripheral surface of a chill roll (a rotating copper alloy disk having a 15 inch diameter, and a 5 inch width). The chill roll was rotated at about 1000 rpm, which corresponds to a linear velocity at the peripheral surface of about 1220 meters per minute. The resulting ribbon was 1.27 cm wide, 1.1 mil thick, and essentially amorphous. Alloy strips of several different lengths were cut from the amorphous ribbon. The width of each alloy strip was 1.27 cm. No surface treatment or scribing was performed.

Each alloy strip was placed in a sensing coil with 221 turns. An ac magnetic field was applied along the longitudinal direction of each alloy strip with a dc biasing field of about 340 A/m. The sensing coil detected the magnetomechanical response of the alloy strip to the ac excitation. The magnetomechanical response, resonant frequency ($f_r$) and output voltage($V_1$) at 1 msec after the termination of the exciting ac field were measured. The results are listed in Table 1 below.

TABLE 1

| l (cm) | $f_r$ (kHz) | $V_1$ (mV) |
| --- | --- | --- |
| 1.80 | 120.21 | 120 |
| 2.51 | 87.81 | 360 |
| 3.15 | 69.61 | 540 |
| 3.81 | 56.68 | 760 |
| 4.40 | 49.38 | 900 |
| 5.14 | 41.88 | 1200 |
| 6.40 | 33.28 | 1490 |

The resonant frequency is inversely proportional to the length, and the output voltage is directly proportional to length. The resonant characteristics of the markers of this Example may be modified to increase the universe of distinct markers by the surface treatments which are described in Examples 2–6, infra. The output voltage profile of the alloy strip having a length of 3.81 and was charted by an oscilloscope attached to the sensing coil and is shown in FIG. 1. Using the data in Table 1; (1=cm, $f_r$ =56.68 khz) the acoustic velocity "v" is $4.32 \times 10^5$ cm/sec. This velocity can be used to determine the effective lengths of modified alloy strips having the same composition.

EXAMPLE 2

Several alloy strips having the same composition as those of Example 1, made according to the process described in Example 1, and having dimensions of $3.81 \times 1.27 \times 0.0028$ cm were scribed via laser irradiation. A 248 nm eximer laser set at 0.62 J/pulse was used to scribe line(s) perpendicular to the length of the alloy strips. The laser fluence levels (F) were 0.16J/cm$^2$ and 0.073J/cm$^2$. After scribing, each alloy strip was decoded as in Example 1. The number of lines scribed on each alloy strip, resonant frequency ($f_r$), and the output voltage at 1 msec after the termination of the exciting ac field ($V_1$) are given in table 2.

TABLE 2

| NO. OF LINES | FLUENCE LEVEL F = 0.073 J/cm$^2$ | | FLUENCE LEVEL F = 0.16 J/cm$^2$ | |
|---|---|---|---|---|
| | $f_r$ (kHz) | $V_1$ (mV) | $f_r$ (kHz) | $V_1$ (mV) |
| 1 | 57.00 | 230 | 57.77 | 400 |
| 2 | 59.96 | 270 | 57.99 | 170 |
| 3 | 57.55 | 440 | 58.25 | 320 |
| 4 | 57.75 | 420 | 58.25 | 320 |
| 5 | 57.35 | 150 | 57.35 | 330 |
| 7 | 57.67 | 135 | 63.58 | 120 |
| 10 | 58.55 | 190 | 60.65 | 45 |
| 12 | 60.25 | 175 | 61.95 | 45 |
| 14 | 63.29 | 20 | 66.38 | 33 |
| 16 | 57.91 | 250 | 56.50 | 42 |
| 18 | 57.45 | 45 | 59.75 | 28 |
| 21 | 58.66 | 260 | 60.84 | 26 |
| 22 | 60.65 | 60 | 62.45 | 28 |
| 25 | 59.73 | 45 | 62.59 | 42 |
| 28 | 60.53 | 180 | 66.97 | 32 |

The output voltage ($V_1$) for the alloy strips which were scribed at a fluence level of 0.16 J/cm$^2$ decreases as the number of perpendicularly scribed lines increases, and approaches a minimum output voltage level of around 30–40 mV beyond 10 lines. Thus, in applications where the output voltage is critical, it is preferable to limit the number of lines to below 10 for alloy strips having the dimensions given above.

The resonant frequency ($f_r$) of the alloy strips scribed at the same fluence level (0.16 J/cm$^2$) displayed four relative maxima over the number of lines scribed on the alloy strips. These maxima, 58.25, 63.58, 66.38 and 6.97 kHz correspond to the alloy strips having 3, 7, 14 and 28 scribed lines. The resonant frequency of the alloy strips which were scribed at a fluence level of 0.073 J/cm$^2$ display relative maxima (59.96, 63.29, 60.65 and 60.53 kHz) at 2, 14, 22 and 28 scribed lines, respectively. If resonant frequencies are the identifying means, these maxima can be utilized to decode markers. Thus, both the number of lines which are introduced onto a given alloy strip, and the fluence at which the lines are scribed alter the resonant characteristics of the resulting marker which may be utilized to expand the universe of distinct markers which can be made.

When the fluence used is 0.073 J/cm$^2$, the output voltages ($V_1$) display local maxima corresponding to alloy strips having 3, 10, 16, 21 and 28 scribed lines. It is believed that these maxima are a result of positive interference of the magnetomechanical waves, which causes an amplification of certain waves. To demonstrate the effect, output voltage profiles of a non-scribed and a laser-scribed (28 lines, last entry of Table 2) alloy strips are compared in FIGS. 1 and 2. FIG. 2 clearly shows the interference of magnetomechanical waves generated which results from the scribing. Peak regions (1, 5, 7 and 9) are created due to the positive interference, and nodal regions (2, 4, 6 and 8) are created as a result of negative interference (peak region 3 is a result of the cessation of the interrogating field). Because each configuration of surface modifications (in this case lines) produces a distinct output voltage profile the output voltage profiles can be utilized to decode a marker. This is easily recognized by examining the changes in the output voltage as the number of lines scribed on an alloy strip changes. Since each distinctly modified alloy strip displays a different output voltage at the same time after being excited, each marker will have a distinct profile. Further, because each output voltage profile is unique to an alloy strip having a given number of lines which have been scribed at a given fluence, using the output voltage profile as a means of decoding vastly increases the possible universe of distinct markers which can be made according to the present invention.

Using the acoustic velocity calculated in Example 1 ($4.32 \times 10^5$ cm/sec) the effective length of the marker scribed with 28 lines at a fluence of 0.073 J/cm$^2$ and resonating at $f_r$ of 60.53 kHz is 3.57 cm (the physical length is 3.81 cm) and for a marker scribed with 28 lines at 0.16J/cm$^2$ the effective length would be 3.22 cm.

EXAMPLE 3

Each of several alloy strips having dimensions 3.81 $\times 1.27 \times 0.0028$ cm, and the same composition as those of Example 1 and made according to Example 1 was scribed with 14 lines perpendicular to the length of the strip. The lines were scribed about 0.2 cm from each other, using 248 nm eximer laser. The laser fluence was varied for each alloy strip. The resonant frequency $f_r$) and the output voltage ($V_1$) for each of the alloy strips was measured as in Example 1, and the results are listed in Table 3, below.

TABLE 3

| FLUENCE (J/cm$^2$) | $f_r$ (kHz) | $V_1$ (mV) |
|---|---|---|
| 0.073 | 63.29 | 20 |
| 0.16 | 66.38 | 33 |
| 0.21 | 67.60 | 30 |
| 0.30 | 69.55 | 18 |

The output voltage level measured was low and somewhat constant with respect to the changing fluence levels. Thus, changing the fluence levels within the range of the present invention does not significantly alter the output voltage of the scribed alloy strip. The resonant frequency increased with increasing fluence levels. Thus, for an alloy strip having a given number of surface modifications introduced perpendicular to the length of the alloy strip, the resonant frequency of each of alloy strip may be varied by varying the fluence level. In this way the universe of distinct markers which can be produced may be increased. Further, for applications which require a higher frequency signal, the resonant frequency of a marker having a given number of surface modifications may be maximized by performing the laser scribing at higher fluence levels.

EXAMPLE 4

Lines were scribed along the longitudinal direction (parallel to the length) of alloy strips having the same composition, dimensions and using the same laser as described in the previous examples. Alloy strips were scribed with 1, 3, 6 and 10 lines at the three fluence levels (F) listed in Table 3. The resonant frequency ($f_r$) and output voltage ($V_1$) were measured according to the procedure of Example 1, and the results are listed in Table 4.

TABLE 4

| NO. OF LINES | F = 0.073 J/cm$^2$ | | F = 0.16 J/cm$^2$ | | F = 0.21 J/cm$^2$ | |
| --- | --- | --- | --- | --- | --- | --- |
| | $f_r$ (kHz) | $V_1$ (mV) | $f_r$ (kHz) | $V_1$ (mV) | $f_r$ (kHz) | $V_1$ (mV) |
| 1 | 56.77 | 820 | 57.05 | 760 | 57.08 | 680 |
| 3 | 57.13 | 660 | 58.23 | 540 | 57.77 | 560 |
| 6 | 58.40 | 370 | 59.40 | 255 | 60.60 | 165 |
| 10 | 61.05 | 170 | 65.55 | 48 | 65.78 | 44 |

Where the surface modifications are introduced parallel to the length of the alloy strip the resonant frequency is little affected by increasing fluence levels. The output voltage decreases with increasing fluence and number of lines. However, for decoding purposes the output voltage may be increased by adding an amplifier to the decoding system. By changing the number of lines introduced parallel to the length of the alloy strip the number of markers having distinct resonant characteristics which can be made is increased.

Further, both the resonant frequency and the voltage output may be measured, thereby providing an internal check for the markers, and expanding the universe of distinct markers which may be produced.

Output voltage profiles for the alloy strips having one and three lines scribed at 0.16J/cm$^2$ are shown in FIGS. 7 and 8 respectively.

EXAMPLE 5

Six (6) lines were scribed on each alloy strip, parallel to the length of the alloy strip. The fluence level (F) was changed for each alloy strip. The resonant frequency ($f_r$) and output voltage ($V_1$) were measured according to the procedure of Example 1, and the results are listed in Table 5.

TABLE 5

| FLUENCE (J/cm$^2$) | $f_r$ (kHz) | $V_1$ (mV) |
| --- | --- | --- |
| 0.073 | 58.40 | 370 |
| 0.16 | 59.40 | 255 |
| 0.21 | 60.60 | 165 |
| 0.30 | 60.20 | 40 |

By comparing the results tabulated in Table 5 with the appropriate entries in Table 1 and 2 (3.81 cm and 5 or 7 lines respectively) it is clear that the resonant markers having surface modifications oriented parallel to the length of the alloy strip have measurably distinct resonant characteristics from both non-scribed and perpendicularly scribed alloy strips. Accordingly, introducing the surface modifications parallel to the length of the alloy strip increases the universe of distinct markers which may be produced according to the present invention.

The output voltage decreases linearly with increasing fluence, and the resonant frequency remains relatively constant. For decoding purposes a detector may be set with a wide detector frequency band so that each of the above markers has the same resonant frequency reading. The frequency is scanned and the voltage output is used as the means of detection. Each marker has a different output voltage, and accordingly is measurably distinct. Further, the linear relationship between the fluence and the voltage output is particularly important because a specific desired output voltage may be imparted onto a alloy strip by changing the fluence of the laser.

EXAMPLE 6

Alloy strips having dimensions of 3.81×1.27×0.0028 cm were scribed with 14 lines at a 45° angle with respect to the length of the alloy strip. The fluence level (F) was varied between the alloy strips. The resonant frequency ($f_r$), and the output voltage ($V_1$) were measured as in the previous examples and the results are shown below in Table 6.

TABLE 6

| FLUENCE (J/cm$^2$) | $f_r$ (kHz) | $V_1$ (mV) |
| --- | --- | --- |
| 0.073 | 59.10 | 125 |
| 0.16 | 63.03 | 28 |
| 0.21 | 63.80 | 30 |
| 0.30 | 67.60 | 10 |

By comparing the results tabulated in Table 6 with the appropriate entries in Table 1 and 2 (3.81 cm and 14 lines respectively) it is clear that the resonant markers having surface modifications which are oriented at an angle with respect to the alloy strip have measurably distinct resonant characteristics. Accordingly, introducing the defects at an angle increases the universe of distinct markers which may be produced according to the present invention.

For alloy strips which are scribed with lines at a 45° angle to the length of the strip the output voltage of the markers decreased as the fluence level increased. The resonant frequency of the markers increased linearly with increasing fluence. Thus, the resonant frequency may be used to decode the markers made according to this Example. Further, because the frequency increases linearly with increasing fluence, a particular frequency may be easily imparted on a given alloy strip simply by changing the fluence level of the laser.

EXAMPLE 7

The output voltage of alloy strips having the same composition as those used in the preceding examples, but having a parallelogram shape were measured. The length width and thickness of the parallelogram shaped strips were the same as those in the preceding examples. The output voltage profiles of strips whose ends were at angles of 20° and 25° and to the length of the alloy strip were measured as in Example 1 are shown in FIGS. 9 and 10 respectively.

The true scope and spirit of the invention is to be determined by the scope of the appended claims, and should not be limited by the foregoing examples.

We claim:

1. A process for altering at least one mechanical resonant characteristic of a mechanically resonating marker comprising a glassy metal alloy strip having a physical length, comprising the step of:

modifying at least one surface of said glassy metal alloy strip so as to produce an effective length which is different from the physical length thereof wherein said modification is accomplished by directing a laser beam onto the surface of said alloy strip to cause said modification wherein said laser is operated at a fluence level between about 0.07 J/cm$^2$ and about 0.3 J/cm$^2$.

2. The process of claim 1 wherein said glassy metal alloy strip has a physical length between about 2 and about 5 cm.

3. The process of claim 1 wherein said glassy metal alloy strip has a width between about 0.5 and about 2.0 cm.

4. The process of claim 1 wherein said modification is introduced parallel to said length of said glassy metal alloy strip.

5. The process of claim 1 wherein said modification is introduced perpendicular to said length of said glassy metal alloy strip.

6. The process of claim 2 wherein said modification is introduced at an angle to said length of said glassy metal alloy strip.

7. A mechanically resonating marker comprising:
a housing; and
disposed within said housing a glassy metal alloy strip having a physical length and a modification imparted to at least one surface of said alloy strip so as to exhibit an effective length which is different from the physical length thereof, thus causing said marker to exhibit at least one mechanical resonant characteristic different from that exhibited in the absence of said modification wherein said modification is introduced onto said marker via laser and said laser is operated as a fluence level between about 0.07 J/cm$^2$ and about 0.3 J/cm$^2$.

8. The marker of claim 7 wherein said different resonant characteristic is a uniquely shaped output voltage profile.

9. The marker of claim 7 wherein said different resonant characteristic is a unique output voltage.

10. The marker of claim 7 wherein said different resonant characteristic is a unique resonant frequency.

11. The marker of claim 8 wherein said uniquely shaped output voltage profile further comprises at least two peaks and one node.

12. The marker of claim 7 wherein said modification is at least one line.

13. The marker of claim 7 wherein said marker has a width between about 0.5 cm and about 2.0 cm and said physical length is between about 2.0 cm and about 5.0 cm.

14. The marker of claim 8 wherein said modification is introduced at an orientation to said physical length chosen from the group comprising parallel, perpendicular, and some angle therebetween.

15. The marker of claim 8 wherein said modification is a non-rectangular shaped alloy strip.

* * * * *